United States Patent [19]
Brusky et al.

[11] Patent Number: 6,008,921
[45] Date of Patent: Dec. 28, 1999

[54] METHODS AND APPARATUS FOR CONVERTING REMOTE CONTROL SIGNALS INTO COMPUTER KEYBOARD SIGNALS

[75] Inventors: Kevin J. Brusky, Magnolia; John W. Frederick, Spring, both of Tex.

[73] Assignee: Comaq Computer Corporation, Houston, Tex.

[21] Appl. No.: 08/831,480

[22] Filed: Mar. 31, 1997

[51] Int. Cl.[6] .................................................. H04B 10/00
[52] U.S. Cl. ............................................. 359/146; 359/142
[58] Field of Search .................................. 359/142, 143, 359/144, 145, 146, 147, 148, 172; 340/825.52, 825.69, 825.72; 364/188, 189

[56] References Cited

U.S. PATENT DOCUMENTS

| | | | |
|---|---|---|---|
| 5,235,414 | 8/1993 | Cohen | 359/146 |
| 5,737,107 | 4/1998 | Umeda | 359/146 |
| 5,850,304 | 12/1998 | Elmers et al. | 359/146 |
| 5,850,340 | 12/1998 | York | 364/188 |
| 5,880,721 | 3/1999 | Yen | 345/327 |

*Primary Examiner*—Rafael Bacares
*Attorney, Agent, or Firm*—Jenkens & Gilchrist, P.C.

[57] ABSTRACT

A computer system adapted to receive and interpret signals from a remote control. The signals received from the remote control are interpreted and transformed into signals equivalent to those produced by a computer keyboard.

14 Claims, 3 Drawing Sheets

METHODS AND APPARATUS FOR CONVERTING REMOTE CONTROL SIGNALS INTO COMPUTER KEYBOARD SIGNALS

BACKGROUND OF THE INVENTION

1. Field of the Invention

The present invention relates to wireless remote control for an electronic device being adapted to provide signals understood by a computer/CPU. More particularly, the present invention relates to a computer system having a receiver for receiving wireless remote commands such that the wireless remote commands are converted into standard keyboard signals having both "make" and "break" portions of the signal indicating at least that a button was both pressed and released.

2. Description of the Related Art

A personal computer/television (PC/TV) convergence device is a fully functional computer integrated with the functionality of a television. The PC/TV provides a TV mode for viewing television related information (e.g., via broadcast, cable, satellite, VCR, digital disk, or other broadcast media). The PC/TV also provides a computer mode for computing functionality. Thus, the convergence of computer and TV functionalities enables a user at least the combined access of television program information, computer related functionality, and Internet access.

A PC/TV convergence device may comprise a fully functional computer which may include a memory, microprocessor, hard drive, floppy disc drive, fax modem, CD-ROM player, monitor, power supply, mouse, game pad/joy stick, microphone, etc. The computer is interfaced with a television or monitor such that the television's or monitor's normal National Television Standards Committee (NTSC) signal is converted to a scan "video graphics adapter" (VGA) signal or the computer's scan VGA signal is converted to an NTSC interface signal.

The PC/TV convergence device is controlled by the computer's operating system (OS). The monitor can display both TV programs and computer applications either at the same time (in separate windows) or in separate modes. Furthermore, the convergence of a PC and a TV into a single system permits the utilization of the communication bandwidth, mass storage, and graphic applications to store and display applications within a television viewing environment. Basically, the computer is merged with consumer electronic functionality thereby enabling an average consumer to take advantage of many computing functions in an easy to use consumer oriented product.

The PC/TV changes a typical television from a passive device to a user interactive device. For example, while a user is watching TV, the user can request the PC/TV to download information from another source, (besides a TV station) such as the Internet, information about, among other things, the TV program. Such information can originate from a web site or via telephone lines or from other data providers.

At present, televisions and personal computers are separate devices. A TV may incorporate a remote control. A standard TV remote control may control a variety of functions of or related to the TV. The remote control transmits infrared (IR) signals to the TV in order to indicate which button on the remote control was depressed.

Also at present, there exists IR computer keyboards. An IR keyboard allows the user to operate a computer without a wire being connected between the IR keyboard and the computer. This provides the user freedom of movement.

When a key is pressed on the IR keyboard, an IR "make" signal is repetitiously sent from the keyboard's IR transmitter and received by an IR receiver associated with the computer. When the same key is released, an IR "break" signal associated with the key is transmitted from the IR keyboard to the computer. The combination of make and break signals informs the computer or CPU that the key on the IR keyboard was pressed and held for a certain period of time and then released.

Since a CPU requires a computer keyboard make and break code for each key press of an IR keyboard, it follows that a CPU would not be able to correctly interpret the IR codes sent from a standard TV remote control. Thus, if a remotely controlled television system and a computer where merged into a PC/TV the converged system would not be able to understand remote control button presses for control of the television. Also, if an IR computer keyboard were used to communicate with the TV system and if some of the remote TV controls were mapped into the IR computer keyboard, the IR receiver associated with the TV would not understand the make and break codes provided by the IR keyboard.

Another problem of operating a PC converged with a television or any other remotely controllable electronic device, would be that if the computer/CPU received an IR signal from the TV remote control, the computer would never receive a break code indicating that the button on the remote control was released. That is, the CPU would only receive a signal from the remote control indicating that a button was pressed, but there would be no signal indicating that the remote control button was depressed.

SUMMARY OF INVENTION

In view of the limitations and shortcomings of the aforementioned inability of an IR remote control to send both a make and a break code to a CPU as well as other disadvantages not specifically mentioned above, it is apparent that there exists a need for a remote control and/or circuitry for receiving remote control signals that can interpret signals received from a remote control and convert the signals into appropriate make and break signals that are understood by a CPU. As a result, the remote control can be used to control both the operations of the PC and the television portions of the converged electronic system.

The present invention may provide a computer system that can receive and interpret wireless signals from both a standard TV remote control or a wireless computer keyboard. The present invention further may provide a receiver associated with both a computer and a remotely controllable device that can interpret signals from a remote control and transform the remote control signals into a signal comprising a make and break portion which is understandable by a CPU.

BRIEF DESCRIPTION OF THE DRAWINGS

Other objects, features, and characteristics of the present invention as well as methods of operation and functions of related elements of structure, and the combination of parts and economics of manufacture, will become apparent upon consideration of the following description and appended claims with reference to the accompanying drawings. All of which form a part of this specification wherein like reference numerals designate corresponding parts in the various figures, and wherein:

DETAILED DESCRIPTION OF THE PREFERRED EXEMPLARY EMBODIMENTS

Figure 1:
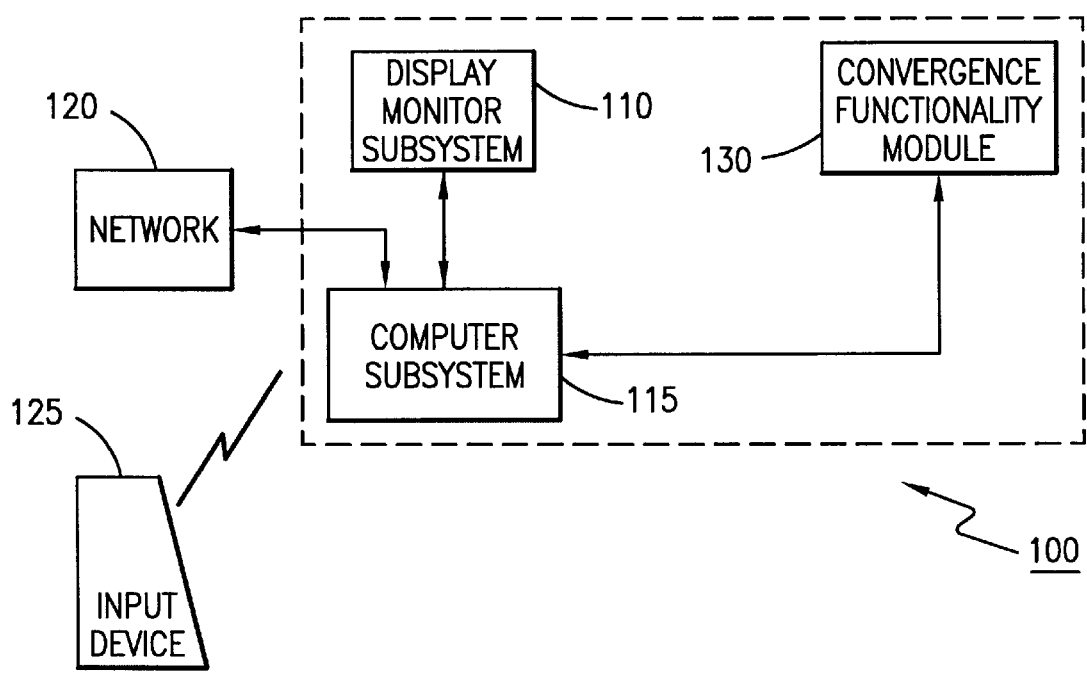
FIG. 1 is an exemplary embodiment of a convergence device in accordance with the teachings of the present invention.

Referring now to the drawings wherein like or similar elements are designated with identical reference numerals throughout the several views, and wherein the various elements depicted are not necessarily drawn to scale, and in particular, to FIG. 1, there is shown a block diagram of a convergence device system 100 utilizing the teachings of the present invention. This block diagram illustrates features of the present invention and basic principles of operation of an exemplary embodiment. The block diagram is not necessarily intended to schematically represent specific modules of hardware or any particular data or control paths therebetween.

The convergence device system 100 includes a first subsystem, a display monitor subsystem 110, operable to receive and display thereon display signals received from a second subsystem, a computer subsystem 115. Although not depicted, the subsystem 115 comprises a processor unit coupled to a storage unit, and may further preferably contain a communication port for enabling communication between the convergence device system 100 and a network 120.

The network 120, it is understood, can be any network, for example, a local area network, a telephone communication system, a metropolitan area network, a wide area network, an intranet network, or an internet network. The computer subsystem 115 is connected to a convergence functionality module 130 that is adapted to receive and/or provide various combinations of composite RF, video, audio, graphics and/or data signals. For example, the module 130 may comprise a receiver for receiving TV signals in any form, such as National Television Standards Committee (NTSC) form or the Phase Alteration Line (PAL) form, via any medium, digital or analog, such as a cable system, a digital satellite system or a network broadcast medium.

In another embodiment, the module 130 may comprise a consumer/home electronics unit adapted to be integrated with the computer subsystem 115. For example, a video gaming unit or a video disc unit may be provided such that the outputs (video, audio, or both) of the units are controlled or modulated by the computer subsystem 115. A video controller service in the subsystem 115 may be responsible for managing these outputs such that appropriately modulated (or decoded or processed) display signals are selected to be forwarded to drive suitable output devices, for example, the display monitor system 110 and/or audio output device (not specifically shown).

Although the module 130 and the subsystem 115 are shown to be two separate yet interconnected entities, the module 130 may, in some embodiments of the present invention, be integrated into subsystem 115. Such an integrated subsystem may comprise in a single housing one or more video sources (or consumer/home electronics units including receivers for TV signals, gaming units, video telephoning units, etc.), a video control device or means for managing and selecting among these sources and for generating appropriate display signals to be provided to suitable output devices, a processor, and data storage devices.

The convergence device system 100 may be operable with an input device 125. The input device may comprise any of the following: a remote control, a standard TV remote control, a remote track-ball/mouse device, a remote pointing device, a wireless keyboard, a wired keyboard, a keyboard integrated with a pointing device or a standard remote control device, et cetera. Furthermore, one of ordinary skill in the art would understand that convergence device systems 100 may contain hardware modules which include, but are not limited to, power supply module, TV tuner circuitry, video imaging circuitry, microphone/audio circuitry, CD-ROM devices, scanning devices, Facsimile devices, et cetera.

Figure 2:
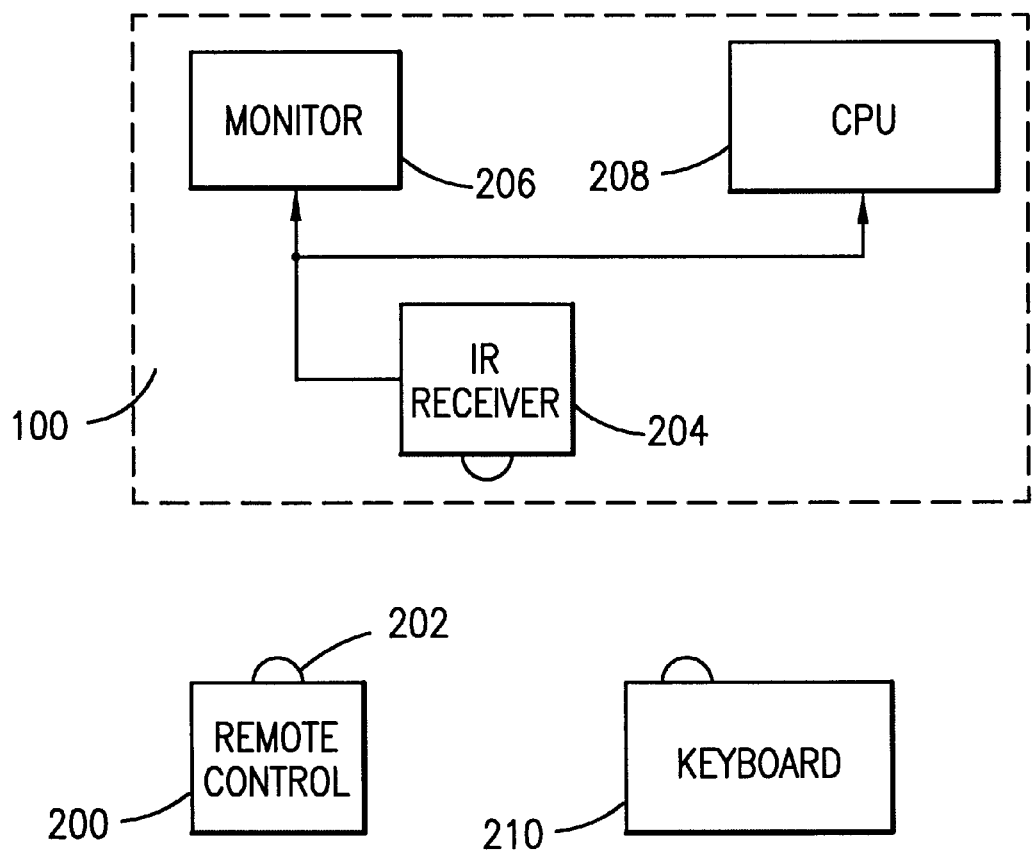
FIG. 2 is a second exemplary embodiment of a convergence device in accordance with the teachings of the present invention.

Referring now to FIG. 2, a general generic consumer electronic remote control 200 for, for example, a remote controlled television, may have some standardized keys and some specialized keys. Most television remote controls have standardized keys, such as channel-up, channel-down, volume-up, and volume-down. When a key on the remote 200 is pressed, for example, an up-channel key, the remote 200, via the remote's IR transmitter 202, transmits an up-channel infrared (IR) signal to an IR receiver 204.

The IR receiver 204 comprises an IR receiver circuit and a means for converting the IR signal into an electrical signal that can be interpreted by the circuitry in a monitor 206 or a CPU 208. The monitor 206, the CPU 208 and the IR Receiver 204 are all comprised within a convergence device system 100.

It is noted that a standard remote control will only indicate that a button on the remote has been pressed. The remote 200 generally does not send a different signal when a button has been depressed or released.

Another example of a remote control's signals is the volume-up signal. When a user presses a volume-up button on the remote, the remote may send a volume-up signal repetitiously at a predetermined rate, until the user depresses or releases the volume-up button. No signal is sent to indicate that the button has been released.

A wireless computer keyboard 210 operates differently than a wireless remote control. A wireless computer keyboard 210 operates in a similar fashion to a wired computer keyboard (a keyboard electrically connected to a CPU) in that when a key is pressed on a wireless computer keyboard a "make" signal is repetitiously sent to the computer (via the IR receiver 204) indicating that a particular key on the keyboard is being pressed. When the key is released, a different signal, a "break" signal is sent from the keyboard 210 to the CPU 208 (via the IR receiver 204) indicating that the particular key has been released.

For the sake of example, the convergence device system 100 of FIG. 2 comprises a computer converged with a television system. It is understood that the computer could be a "personal" computer and could be converged with or connected to a variety of other electronic devices. Such electronic devices include, but are not limited to, a video player; a digital disk player; a compact disc player; a RF tuner, cable tuner/channel selector, or satellite tuner; a telecommunication device such as a Sega® game system, Sony® game system or other gaming system.

In an exemplary convergence system, the operating system of the computer controls other electronic devices converged with the computer. Thus, if a television system is converged, then the CPU and/or operating system of the computer must understand signals provided by a remote control that provides control of a television. Thus, an exemplary embodiment of the present invention makes the signals received from a remote control look like computer keyboard signals when they are provided to the CPU.

Referring again to FIG. 2, both the keyboard 210 and the remote control 200 are adapted to send IR signals to an IR receiver 204. A difference between the IR signal originated at the remote control 200 and the IR signal originated from the wireless computer keyboard 210 is that the remote only sends a signal indicating that a button has been pressed. On the other hand, the keyboard sends a signal that comprises at least two parts. The first part (make) of the keyboard signal indicates that a specific key has been pressed, while the second part (break) indicates that the key has been depressed.

Thus, the IR receiver, in response to the reception of the make and break codes from the keyboard converts the received IR signals into make and break codes to be sent to the CPU.

When a button on the remote control 200 is pressed, the IR receiver will receive the IR code indicating that a button was pressed. The IR receiver then translates the received IR code into a make code for the specific button that was pressed on the keyboard and sends the make code to the CPU. When the user depresses the button on the remote 200, no IR signal is sent. Thus, the circuitry and software associated with the IR receiver will note that the IR signal is no longer being sent and will create a break code and send it on to the CPU indicating that the button is no longer being pressed.

If the user is holding down a remote control button, for example the volume up-button, then the remote 200 may be repetitiously sending volume-up IR signals to the IR receiver 204. The IR receiver circuitry and related software is adapted to understand that the repetitious sending of the up-volume signal can be transformed into multiple make signals; just like a continuous pressing of a keyboard key. When the remote control volume-up button is depressed, the up-volume IR signal is no longer being sent to the IR receiver 204. The IR receiver will "time out" after approximately 150 ms and create a break signal to send to the CPU to indicate that the remote control button has been depressed. As a result a constant press and then release of a remote control button will be transformed into a "make, make, make, make . . . break" signal received by the CPU. And, a repetitious pressing and depressing of a remote control button by a user will result in a "make, break, make, break" signal received by the CPU. Both of these results are the same result that similar presses of keys on a computer keyboard would produce.

Furthermore, if a user, for example, presses an up-channel button on the remote, then immediately presses an up-volume button on the remote, the present exemplary embodiment of the present invention will create the make code for the channel-up code, then create a break code for channel up, then create the make code for volume-up, then time-out and send the break code for volume up. It is possible that the break code for the channel-up button will be created after the make code for the volume-up button press; this is acceptable in the present exemplary invention.

The CPU receives the make and break codes that have been created by the IR receiver and its associated software. The CPU then controls the converged device or peripheral device in accordance with the make and break codes that were received.

In an exemplary embodiment software, firmware or hardware can be set up to handle the receipt of button presses from a remote control 200. In an exemplary embodiment the following requirements should be met:

1. When an IR transmission is received from a remote control, the IR receiver should send the appropriate make code for the remote button.

2. If no other IR transmissions are received from the remote for approximately 150 ms, the IR receiver should automatically send a break code for the last IR transmission from the remote control.

3. If another IR remote transmission is received from the remote, and less than 150 ms has passed since the last IR remote reception, and the received transmission is the same as the previously received IR transmission, then the IR receiver should not send a break code for the previous key. The IR receiver should send the current make code.

4. If another IR remote transmission is received, and less than 150 ms has passed since the last receipt of an IR transmission, and the received code is different from the previously received code, then the IR receiver should send a break code for the previous make code sent to the CPU and then send a make code for the currently received IR transmission.

Figure 3:
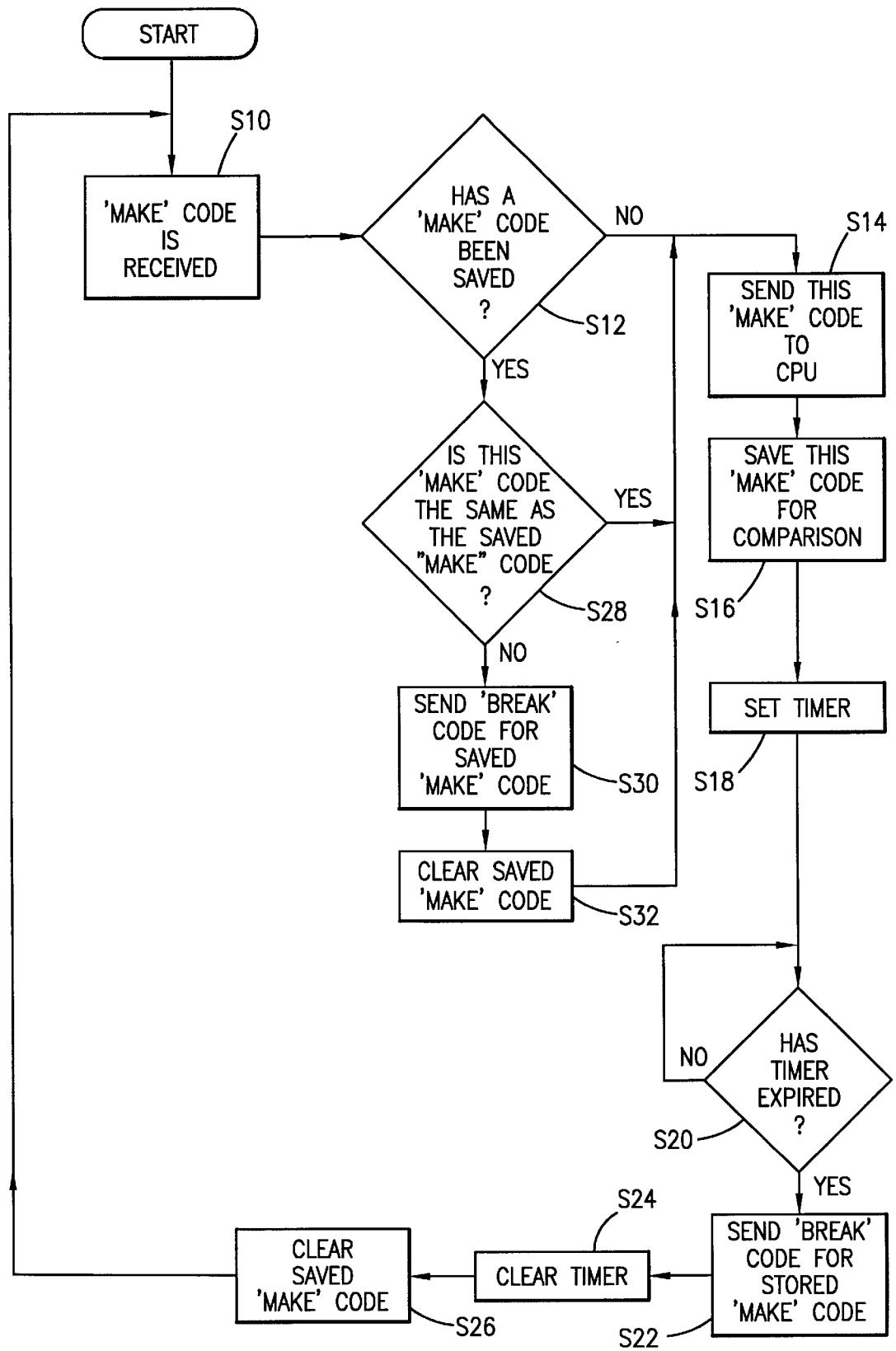
FIG. 3 is a flow chart describing an exemplary method of converting remote control signals into computer keyboard signals in accordance with the teachings of the present invention.

FIG. 3 depicts a flow chart describing the various exemplary steps taken by an IR receiver and related software when a code (a make code or signal) is received from an IR remote control.

In S10 the IR receiver determines whether a code (a make code from a remote) has been received. In S12 the software determines whether this code has been stored in memory at a previous time. Assuming that it has been a while (more than 150 ms) since the last make code has been received from the IR remote, then no make code is being saved.

In step S14 the received IR code is translated into the appropriate make code and sent to the CPU. The make code is then stored in step S16. A timer is set to measure 150 ms in step S18.

In step S20, if more than 150 ms elapse before another code is received from the IR remote then the timer expires and the break code for the stored make code is sent to the CPU. The timer is then cleared in step S24 and the make code is cleared from memory in step S26.

If, back in S10 no codes from the IR remote are received the program waits until the timer expires to send a break code S22.

If back in step S12 a make code is being stored in memory when another make code is received by the IR receiver then the program progresses the step S28. In step S28 it is determined as to whether the presently received make code is the same as the saved make code. If they are the same then the program advances to S14. If on the other hand, the make code received is different than the make code that is being stored, then a break code for the stored make code is sent to the CPU in S30. The saved make code is then cleared in S32 and then the process continues to step S14.

It is understood that the remote control and/or receiver do not have to be infrared transmitters and receivers. The technology used to transmit the information could be sound waves (either audible or inaudible), electromagnetic waves or any frequency of light. The important aspect of the invention here is that button presses on a remote control can be received, translated, and used by a computer converged with another electronic device wherein the remote control can be used to control the converted electronic device or control aspects of the computer.

A person of ordinary skill in the art would understand and appreciate the multitude of variations with respect to the translation of a remote control transmission signal into a standard computer keyboard make-break signal. Thus, a few of the preferred exemplary embodiments of the present invention have been shown and described. It would be appreciated by those skilled in the art that changes may be made in the disclosed embodiments and spirit of the invention, the scope of which is defined in the appended claims.

What is claimed is:

1. A computer system adapted to receive and interpret remote control signals from a remote control and a wireless keyboard, comprising:

a CPU;

a remote control, not electrically connected to said CPU, for wirelessly transmitting a first signal, wherein said first signal indicates that a first button on said remote control is being depressed;

a wireless computer keyboard, not electrically connected to said CPU, for wirelessly transmitting a second signal, said second signal including a first portion and a second portion, said first portion indicates a second button on said wireless keyboard is being pressed, said second portion indicates that said second button on said wireless keyboard has been released;

a receiver for receiving said first signal and said second signal, said receiver comprising circuitry for reformatting said first signal into a first format having a make portion and a break portion and sending said first format to said CPU.

2. The computer system of claim 1, wherein said means for reformatting reformats said second signal into said first format such that said first portion is reformatted into said make portion and said second portion is reformatted into said break portion.

3. The computer system of claim 1, wherein said first portion indicates that a key on said wireless computer keyboard was pressed and said second portion indicates that said key on said wireless computer keyboard was depressed.

4. The computer system of claim 1, wherein said first signal indicates that a button on said remote control was pressed.

5. The computer system of claim 1, wherein said first signal is an infrared signal.

6. The computer system of claim 1, wherein said second signal is an infrared signal.

7. The computer system of claim 1, wherein said CPU is converged with a remotely controllable system.

8. A computer system converged with a remotely controllable system, comprising:

a remote control for providing a first wireless signal to control at least said remotely controllable system, said first wireless signal only indicating that a button on said remote control has been pressed;

a CPU;

receiver circuitry, in electrical communication with said CPU, adapted to receive said first wireless signal and in response thereto provide said CPU with a make signal and a break signal.

9. The computer system of claim 8, further comprising a keyboard, said keyboard sending said make and said break signals to said CPU when at least one of a predetermined key and a key combination is pressed and depressed on said keyboard.

10. The computer system of claim 9, wherein said keyboard comprises transmitter circuitry and said receiver circuitry.

11. The computer system of claim 8, wherein said break signal is a simulated break signal.

12. The computer system of claim 8, wherein said receiver circuity further comprises means for converting said first wireless signal into said make signal and said break signal.

13. A method of simulating make and break signals of a computer keyboard using a wireless remote control, comprising the steps of:

pressing a button on a wireless remote control;

transmitting, from said remote, a first wireless signal only indicating that said button was pressed;

receiving said first wireless signal by a receiver;

translating said first wireless signal into a computer keyboard style signal; and providing said computer keyboard style signal to a CPU.

14. The computer system of claim 13, wherein said computer keyboard style signal comprises a make portion and a break portion.

* * * * *